(12) United States Patent
Kaneshige (10) Patent No.: US 10,826,032 B2
(45) Date of Patent: Nov. 3, 2020

(54) BATTERY PACK

(71) Applicant: SUBARU CORPORATION, Tokyo (JP)

(72) Inventor: Masahiro Kaneshige, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 15/646,294

(22) Filed: Jul. 11, 2017

(65) Prior Publication Data

US 2018/0062125 A1 Mar. 1, 2018

(30) Foreign Application Priority Data

Aug. 31, 2016 (JP) .................................. 2016-169116

(51) Int. Cl.
*H01M 2/10* (2006.01)
(52) U.S. Cl.
CPC ....... *H01M 2/1016* (2013.01); *H01M 2/1022* (2013.01); *H01M 2220/20* (2013.01)
(58) Field of Classification Search
CPC ............. H01M 2/1016; H01M 2/1022; H01M 2220/20
USPC ........................................................ 307/150
See application file for complete search history.

(56) References Cited

U.S. PATENT DOCUMENTS

| | | | | |
|---|---|---|---|---|
| 2012/0097466 A1* | 4/2012 | Usami | ...................... | B60K 1/04 180/68.5 |
| 2012/0156539 A1* | 6/2012 | Honjo | ................. | H01M 2/1083 429/100 |
| 2014/0027189 A1* | 1/2014 | Fujii | ........................ | B60K 1/04 180/68.5 |
| 2014/0329125 A1* | 11/2014 | Miyanaga | ................ | B60K 1/04 429/100 |
| 2014/0338996 A1* | 11/2014 | Baccouche | .......... | B62D 21/152 180/68.5 |
| 2016/0190662 A1* | 6/2016 | Kimura | ............... | H01M 10/625 429/120 |
| 2016/0285140 A1* | 9/2016 | Kimura | ................... | B60L 58/27 |
| 2016/0355100 A1* | 12/2016 | Ito | ........................ | B60L 11/1877 |

(Continued)

FOREIGN PATENT DOCUMENTS

| | | |
|---|---|---|
| JP | 11213976 A | 8/1999 |
| JP | 2012-129074 A | 7/2012 |

OTHER PUBLICATIONS

Decision to Grant a Patent for JP Patent Application No. 2016-169116, issued on Aug. 7, 2018, 3 pages of Decision to Grant and 3 pages of English Translation.

(Continued)

*Primary Examiner* — Rexford N Barnie
*Assistant Examiner* — Swarna N Chowdhuri
(74) *Attorney, Agent, or Firm* — Chip Law Group (57) ABSTRACT

A battery pack includes: at least one battery module; a housing; and attachment members. The at least one battery module is housed in the housing. The attachment members are coupled to the housing, and attachable to a vehicle body. The housing is positioned under a floor of a vehicle. Each of the attachment members extends from a side of the housing to another side along a lower surface of the housing. Lower surfaces of the attachment members are coupled to a plate member. A lower portion of the battery pack has a double-bottomed part formed by the plate member and a bottom surface of the housing.

19 Claims, 9 Drawing Sheets

(56) References Cited

U.S. PATENT DOCUMENTS

2017/0305248 A1* 10/2017 Hara .................. H01M 2/1083
2018/0244142 A1* 8/2018 Takayanagi ............. B60K 1/00
2018/0287125 A1* 10/2018 Schoenherr ............ H01M 2/26

OTHER PUBLICATIONS

Office Action for JP Patent Application No. 2016-169116, dated Feb. 27, 2018, 3 pages of Office Action and 4 pages of English Translation.

\* cited by examiner

BATTERY PACK

CROSS-REFERENCE TO RELATED APPLICATIONS

The present application claims priority from Japanese Patent Application No. 2016-169116 filed on Aug. 31, 2016, the entire contents of which are hereby incorporated by reference.

BACKGROUND

1. Technical Field

The present invention relates to a battery pack.

2. Related Art

Electric vehicles (EVs) and hybrid electric vehicles (HEVs) are known today that include drive motors as driving sources for driving the drive wheels of the vehicles. Such a vehicle is equipped with a battery pack including battery modules that accumulate electric power to be supplied to the drive motors. Specifically, the battery modules each include cells and are housed in the housing of the battery pack. Electric vehicles and hybrid electric vehicles can have to include bigger battery modules or a larger number of battery modules in the battery pack in order to travel a longer distance.

The battery pack is then provided with bigger battery modules or a larger number of battery modules therein, and thus can be bigger. Some of vehicles equipped with a battery pack having relatively large dimensions have the battery pack disposed under the floor the vehicles. If the space under the floor of a vehicle is used in this way as the space in which a battery pack is installed, it is possible to secure a relatively large vehicle compartment space in spite of the relatively large dimensions of the battery pack. For instance, Japanese Unexamined Patent Application Publication No. H11-213976 discloses a vehicle including, on the underside of the floor of the vehicle, a case that has battery housing spaces in which battery cells are housed.

Incidentally, if a battery pack is disposed under the floor of a vehicle, the battery modules in the housing of the battery pack easily receives a relatively heavy load. Specifically, the lower portion of the vehicle collides with an object outside the vehicle, which can cause a relatively heavy load to be transferred to the bottom surface of the housing of the battery pack. In such a case, the relatively heavy load transferred to the bottom surface of the housing can be imparted to the battery modules in the housing via the bottom surface of the housing. Further, when the lower portion of the vehicle collides with an object outside the vehicle, the object collides with the lower portion of the battery pack in some cases. In such a case, the object collides with the bottom surface of the housing, and can penetrate the bottom surface. This can cause the object penetrating the bottom surface of the housing to collide with the battery modules in the housing. A relatively heavy load can be therefore imparted to the battery modules in the housing. In this way, a relatively heavy load imparted to the battery modules in the housing can damage the battery modules installed in the battery pack.

SUMMARY OF THE INVENTION

It is desirable to provide a novel and improved battery pack that is disposed under the floor of a vehicle, and can prevent the battery modules installed in the battery pack from being damaged.

An aspect of the present invention provides a battery pack including: at least one battery module; a housing in which the at least one battery module is housed; and attachment members that are coupled to the housing, and attachable to a vehicle body. The housing is positioned under a floor of a vehicle. Each of the attachment members extends from a side of the housing to another side along a lower surface of the housing. Lower surfaces of the attachment members are coupled to a plate member. A lower portion of the battery pack has a double-bottomed part formed by the plate member and a bottom surface of the housing.

The plate member may be made of a metallic material.

The plate member may be installed to cover a whole of the lower surface of the housing.

The plate member and the lower surface of the housing facing each other may have substantially a same dimension.

An entire periphery of the plate member may be joined to side surfaces of the housing. The double-bottomed part may have a closed space therein.

The double-bottomed part nay include a heat insulating member therein.

DETAILED DESCRIPTION

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

1. Overview of Vehicle

Figure 1:
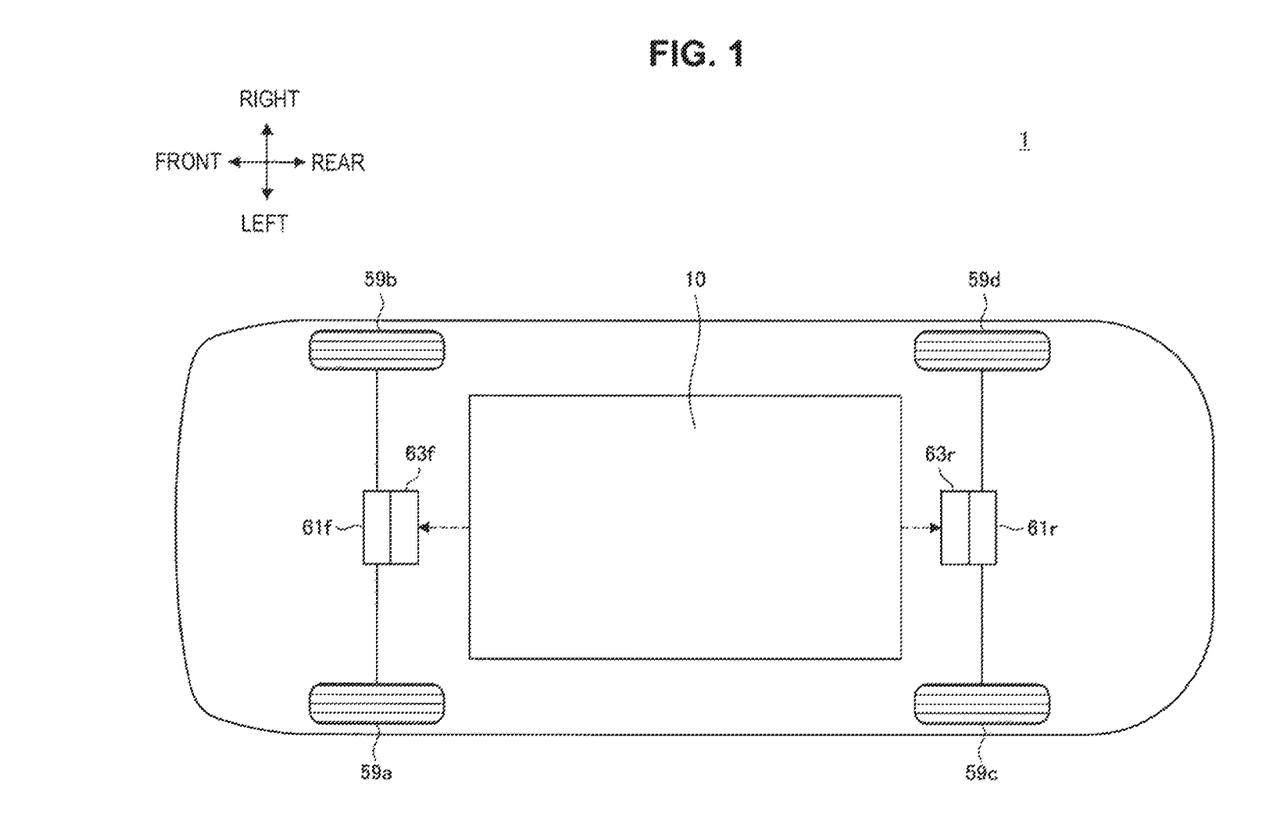
FIG. 1 is a schematic diagram illustrating an instance of a schematic configuration of a drive line of a vehicle according to an example of the present invention.
Figure 2:
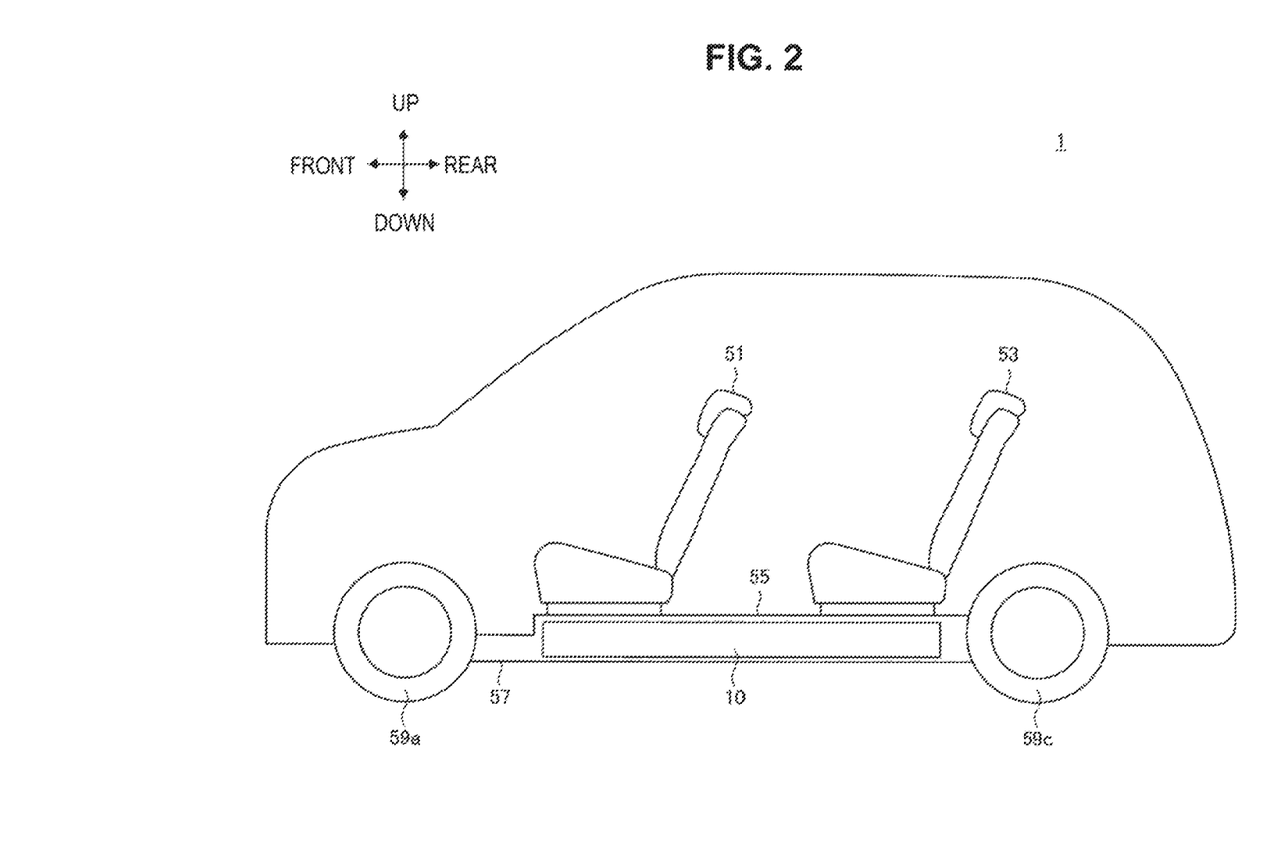
FIG. 2 is a schematic diagram illustrating an instance of a position of a battery pack in the vehicle according to the example.

First, the overview of a vehicle 1 according to an example of the present invention will be described with reference to FIGS. 1 and 2. FIG. 1 is a schematic diagram illustrating an instance of the schematic configuration of the drive line of the vehicle 1 according to the present example. FIG. 2 is a schematic diagram illustrating an instance of the position of a battery pack 10 in the vehicle 1 according to the present example.

The vehicle 1 is an instance of a vehicle including the battery pack 10 according to the present example. Specifically, the vehicle 1 is an electric vehicle including drive motors 63f and 63r as driving sources for driving drive wheels 59a, 59b, 59c, and 59d as illustrated in FIG. 1. The drive wheels 59a, 59b, 59c, and 59d respectively correspond to the front left wheel, the front right wheel, the rear left wheel, and the rear right wheel of the vehicle 1. Additionally, the following describes the traveling direction of the vehicle 1 as front direction, the opposite direction to the traveling direction as rear direction, the left side and right side of the vehicle 1 facing the traveling direction respectively as left direction and right direction, and the upward perpendicular direction and the downward perpendicular direction respectively as up direction and down direction.

The drive motor 63f is coupled to the drive wheel 59a and the drive wheel 59b via a decelerator 61f. Meanwhile, the drive motor 63r is coupled to the drive wheel 59c and the drive wheel 59d via a decelerator 61r. The driving force generated by the drive motor 63f is transmitted to the drive wheel 59a and the drive wheel 59b via the decelerator 61f. Meanwhile, the driving force generated by the drive motor 63r is transmitted to the drive wheel 59c and the drive wheel 59d via the decelerator 61r. The decelerators 61f and 61r have a function of converting the power input from the drive motors 63f and 63r at a predetermined speed reducing ratio, and outputting the converted power to the respective drive wheels. The function of the decelerators 61f and 61r is executed, for instance, by gears. Additionally, the vehicle 1 does not have to include the decelerators 61f and 61r as components. In that case, the drive motor 63f may be directly coupled to each of the drive wheels 59a and 59b, while the drive motor 63r may be directly coupled to each of the drive wheels 59c and 59d.

The drive motors 63f and 63r are electrically coupled to the battery modules in the battery pack 10 via inverters that are not illustrated. The direct current supplied from the battery pack 10 is converted into alternating current by the inverters, and supplied to the drive motors 63f and 63r. This allows the drive motors 63f and 63r to generate power.

The battery pack 10 is specifically a high-voltage electric power source (e.g., 350V). For instance, the electric power accumulated in the battery modules in the battery pack 10 can be supplied not only to the drive motors 63f and 63r via the inverters, but also to a low-voltage battery that accumulates electric power to be supplied to the variety of devices in the vehicle 1.

The battery pack 10 according to the present example is disposed under the floor of the vehicle 1. Specifically, the battery pack 10 is disposed below a floor panel 55 and above an undercover 57 as illustrated in FIG. 2. The floor panel 55 corresponds to the bottom of the vehicle compartment of the vehicle 1. The bottom of the vehicle 1 is covered with the undercover 57. More specifically, the battery pack 10 is installed to extend from the position below a front seat 51 to the position below a rear seat 53 under the floor of the vehicle.

In this way, the space under the floor of the vehicle 1 is used as the space in which the battery pack 10 is installed in the present example. This makes it possible to secure a relatively large vehicle compartment space even if the battery pack 10 has relatively large dimensions. It is therefore possible to install bigger battery modules or a larger number of battery modules in the battery pack 10. The vehicle 1 can thus travel a longer distance.

Here, if the battery pack 10 is disposed under the floor of the vehicle 1, the battery modules in the housing of the battery pack 10 easily receives a relatively heavy load as described above. This can damage the battery modules installed in the battery pack 10. It then seems to be desirable to prevent the battery modules installed in the battery pack 10 disposed under the floor of the vehicle 1 from being damaged. According to the present example, if the lower portion of the battery pack 10 has a double-bottomed part, it is possible to prevent the battery modules installed in the battery pack 10 disposed under the floor of the vehicle 1 from being damaged. The following describes the details of that battery pack 10.

2. Battery Pack

Next, the configuration of the battery pack 10 according to the present example will be described with reference to FIGS. 3 to 6.

Figure 3:
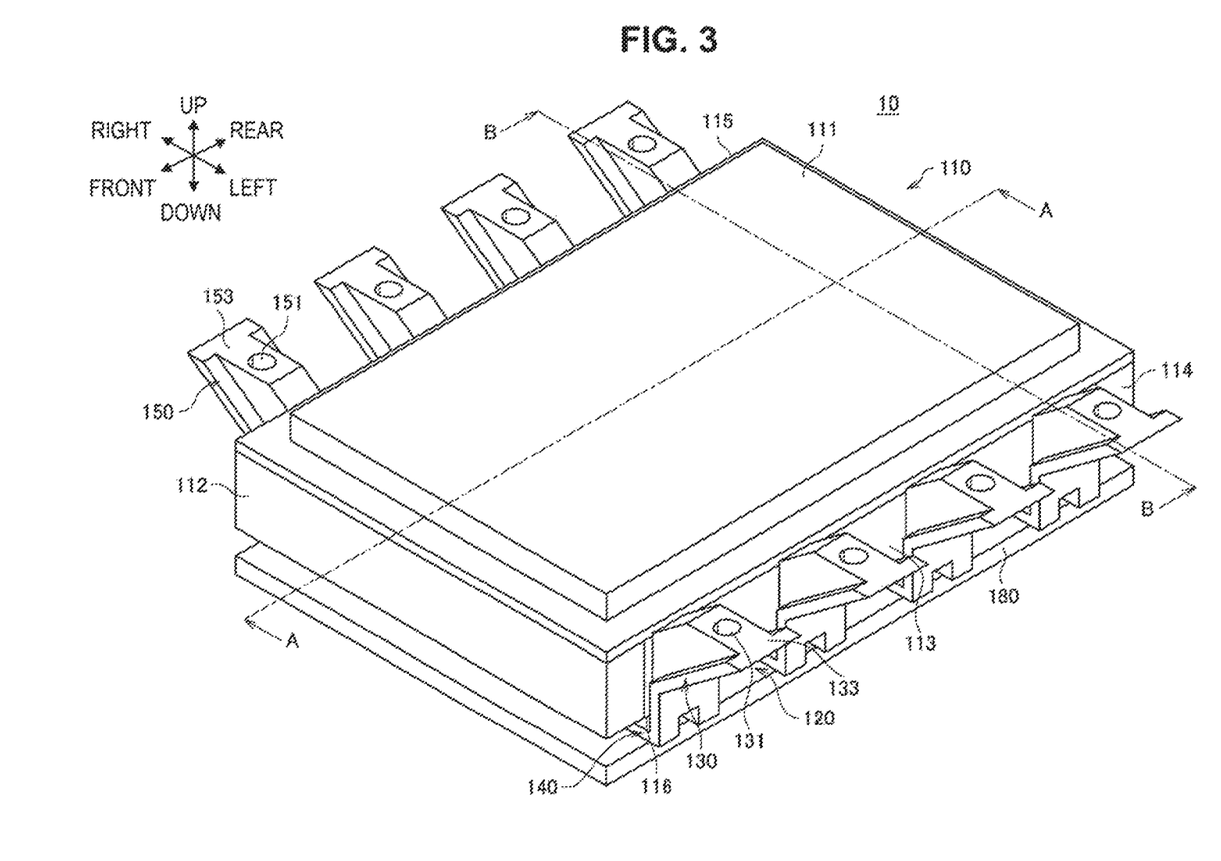
FIG. 3 is a perspective view illustrating an instance of an appearance of the battery pack according to the example.
Figure 4:
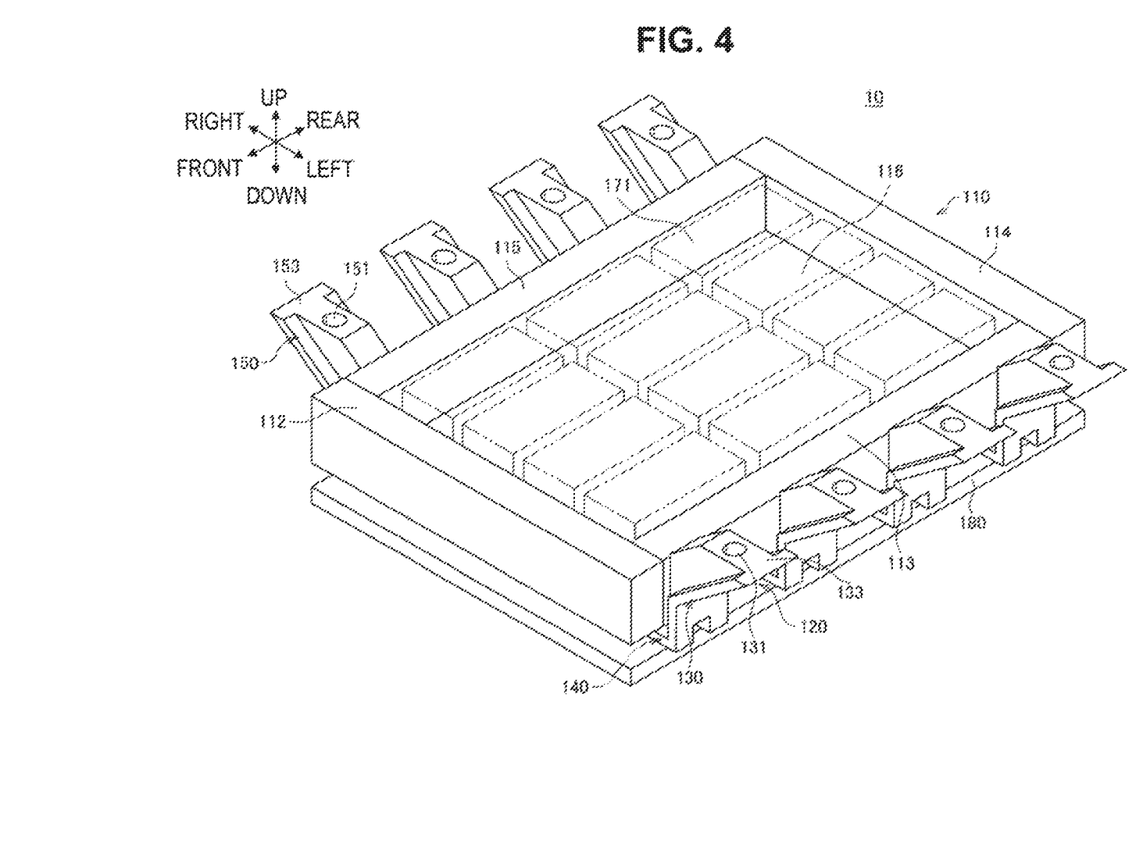
FIG. 4 is a perspective view illustrating an instance of an internal configuration of the battery pack according to the example.
Figure 5:
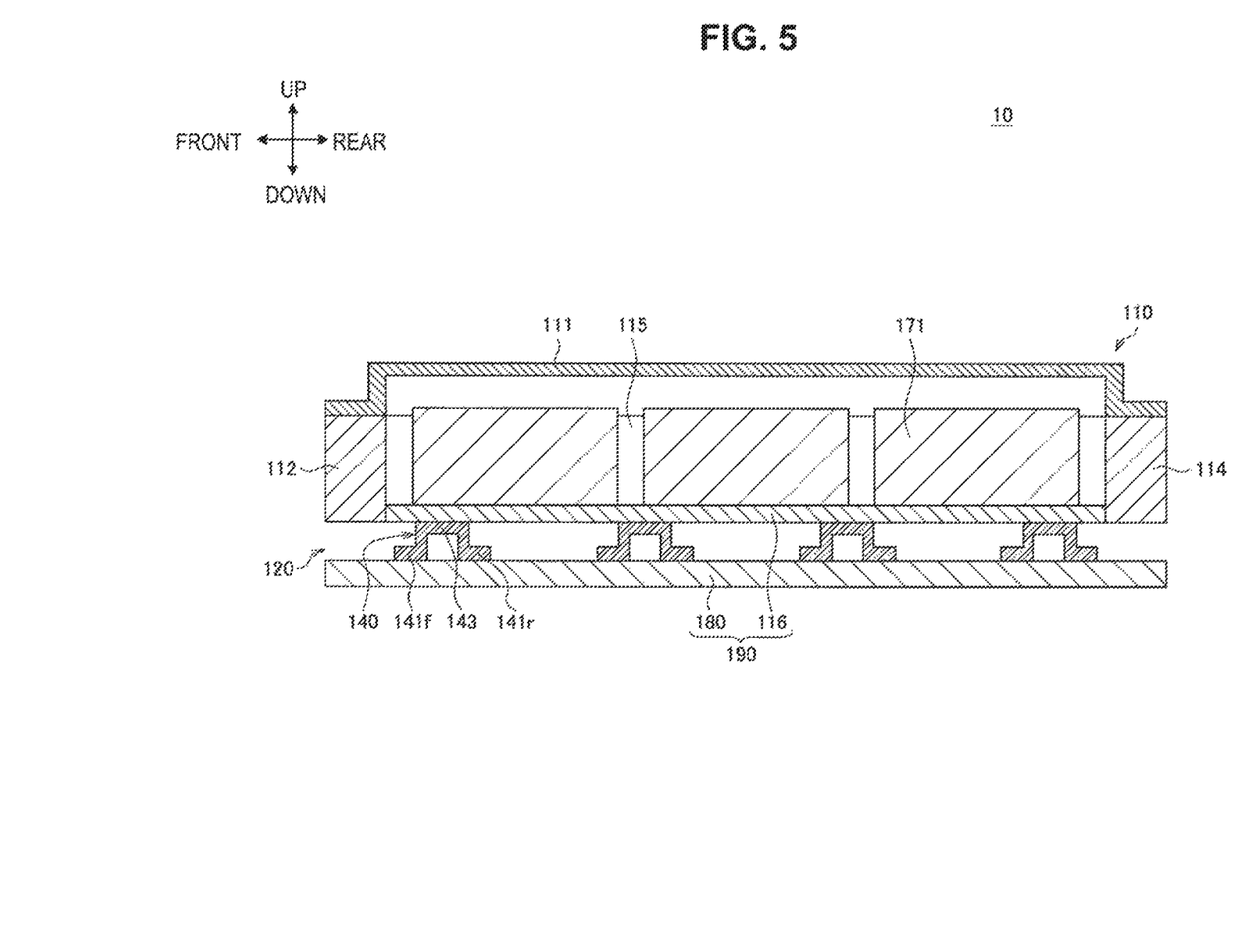
FIG. 5 is a cross-sectional view of the battery pack according to the example taken along a direction orthogonal to a left-right direction of the vehicle, and illustrates an instance of the internal configuration of the battery pack.
Figure 6:
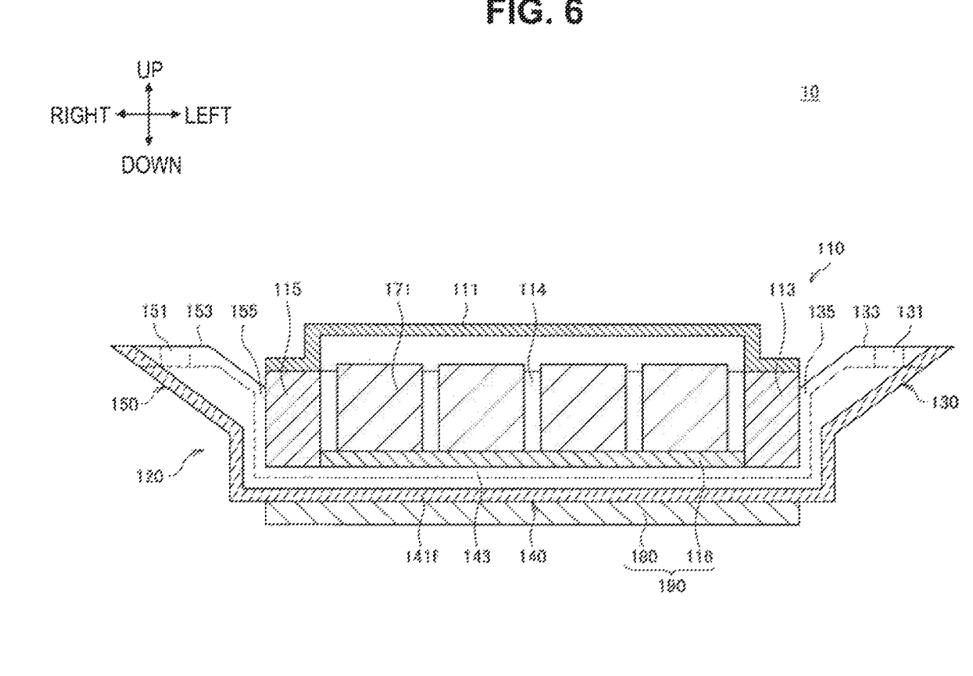
FIG. 6 is a cross-sectional view of the battery pack according to the example taken along a direction orthogonal to a front-rear direction of the vehicle, and illustrates an instance of the internal configuration of the battery pack.

FIG. 3 is a perspective view illustrating an instance of the appearance of the battery pack 10 according to the present example. FIG. 4 is a perspective view illustrating an instance of the internal configuration of the battery pack 10 according to the present example. Specifically, FIG. 4 illustrates the battery pack 10 with a top surface 111 of a housing 110 detached. For ease of understanding, battery modules 171 represented by chain double-dashed lines look transparent, and the inside of the housing 110 is visible in FIG. 4. FIG. 5 is a cross-sectional view of the battery pack 10 according to the present example taken along the direction orthogonal to the left-right direction of the vehicle 1, and illustrates an instance of the internal configuration of the battery pack 10. Specifically, FIG. 5 is a cross-sectional view taken along A-A illustrated in FIG. 3. The cross section taken along A-A is a cross section obtained by cutting through the battery modules 171. FIG. 6 is a cross-sectional view of the battery pack 10 according to the present example taken along the direction orthogonal to the up-down direction of the vehicle 1, and illustrates an instance of the internal configuration of the battery pack 10. Specifically, FIG. 6 is a cross-sectional view taken along B-B illustrated in FIG. 3. The cross section taken along B-B is a cross section obtained by cutting through the battery modules 171 and front legs 141f of attachment members 120.

As illustrated in FIGS. 3 and 4, the battery pack 10 includes the battery modules 171, the housing 110 in which the battery modules 171 are housed, and the attachment members 120 used to attach the battery pack 10 to the vehicle body. Additionally, the battery pack 10 can include a control device and a variety of sensors that control communication with an external device and the charging and discharging of the battery modules 171. Further, the battery pack 10 can include a cooling member used to cool the battery modules 171.

The battery modules 171 each include cells and are housed in the housing 110. The cells are electrically coupled in series in the battery modules 171. Specifically, the two or more battery modules 171 can be housed in the housing 110. These battery modules 171 are electrically coupled in series or in parallel in the battery pack 10. For instance, some of the battery modules 171 may be electrically coupled to each other in series, and the others of the battery modules 171 may be coupled to each other in parallel.

The battery modules 171 are each fixed onto a bottom surface 116 of the housing 110, for instance, by fastening screws. The battery modules 171 may be arranged side by side, for instance, in the housing 110 in the left-right direction and the front-rear direction. Specifically, the four battery modules 171 and the three battery modules 171 may be respectively disposed in the left-right direction and the front-rear direction as illustrated in FIG. 4, which means that the twelve battery modules 171 are installed in total. Additionally, the number of battery modules 171 and the disposition of the battery modules 171 illustrated in FIG. 4 are merely an instance. The number of battery modules 171 and the disposition of the battery modules 171 housed in the housing 110 are not limited in particular.

As described above, the battery pack 10 is disposed under the floor of the vehicle 1 in the present example, and the housing 110 is thus positioned under the floor of the vehicle 1. As illustrated in FIGS. 3 and 4, the housing 110 has the bottom surface 116, a front side surface 112, a left side surface 113, a rear side surface 114, a right side surface 115, and the top surface 111. The bottom surface 116, the front side surface 112, the left side surface 113, the rear side surface 114, the right side surface 115, and the top surface 111 form a closed space therein. The battery modules 171 are housed in the closed space. When the front side surface 112, the left side surface 113, the rear side surface 114, and the right side surface 115 are not distinguished in particular, the following also refers to the front side surface 112, the left side surface 113, the rear side surface 114, and the right side surface 115 simply as side surfaces.

The bottom surface 116 has, for instance, a substantially rectangular plate shape. Further, the bottom surface 116 can be made of a metallic material.

The front side surface 112, the left side surface 113, the rear side surface 114, and the right side surface 115 are coupled to the respective sides of the bottom surface 116. Specifically, as illustrated in FIGS. 5 and 6, the lower portion of the inner peripheral surface of each side surface is coupled to the side of the bottom surface 116. The left side surface 113 and the right side surface 115 are a pair of side surfaces that extend in the front-rear direction of the vehicle 1 and face each other. The front side surface 112 and the rear side surface 114 are a pair of side surfaces that extend in the width direction of the vehicle 1 and face each other. Each side surface has, for instance, a hollow or solid prismatic shape. Further, each side surface can be made of a metallic material. Each side surface can be joined to the bottom surface 116, for instance, by welding. Further, side surfaces adjacent to each other can be joined to each other, for instance, by welding. Additionally, the bottom surface 116 and each side surface may be permanently affixed to each other, for instance, by stamping a plate member.

The top surface 111 faces the bottom surface 116, and is coupled to the upper end of each side surface. Specifically, the central part of the top surface 111 protrudes upward as illustrated in FIG. 3, and the part on the outer edge side of the central part is coupled to the upper end of each side surface. For instance, the top surface 111 can be made of a metallic material or a resin. If the top surface 111 is made of a metallic material, the part corresponding to the central part of the top surface 111 can be formed, for instance, by stamping. If the top surface 111 is made of a resin, the part corresponding to the central part of the top surface 111 can be formed, for instance, by injection molding. The top surface 111 can be detachably fixed to each side surface, for instance, by fastening screws.

The attachment members 120 are coupled to the housing 110, and attachable to the vehicle body. The battery pack 10 can be therefore attached to the vehicle body of the vehicle 1 by attaching the attachment members 120 to the vehicle body. The following describes the details of these attachment members 120.

Each of the attachment members 120 extends from a side of the housing 110 to the other side along the lower surface of the housing 110. For instance, the attachment members 120 extend from the right side to the left side of the housing 110 along the lower surface of the housing 110. These attachment members 120 are arranged side by side on the battery pack 10 at intervals, for instance, along the direction orthogonal to the direction in which the attachment members 120 extend. Specifically, the attachment members 120 may be arranged side by side at even intervals as illustrated in FIGS. 3 to 5 along the front-rear direction, which is orthogonal to the left-right direction, in which the attachment members 120 extend. Additionally, FIGS. 3 to 6 illustrate an instance in which the four attachment members 120 are arranged side by side, but the number of attachment members 120 is not limited in particular.

Specifically, as illustrated in FIGS. 3 to 6, the attachment members 120 each have an extending part 140 that extends from the right side to the left side of the housing 110 along the lower surface of the housing 110, a right attachment part 150 that protrudes upward from the right end of the extending part 140, and a left attachment part 130 that protrudes upward from the left end of the extending part 140. The attachment members 120 can be made of a metallic material. Additionally, the lower surface of the housing 110 can be constituted of the bottom surface 116 and the lower surface of each side surface.

The extending part 140 has a cross-sectional shape that protrudes at the central part 143 with respect to the front-rear direction toward the housing 110, for instance, as illustrated in FIG. 5. Specifically, the central part 143 of the extending part 140 protrudes upward. The central part 143 abuts the bottom surface 116, the right side surface 115, and the left side surface 113 of the housing 110. The upper surface of the central part 143 is coupled to the lower surface of the housing 110. The upper surface of the central part 143 can be joined to the lower surface of the housing 110, for instance, by welding. The front leg 141$f$ and a rear leg 141$r$ of the extending part 140 respectively positioned in front of and behind the central part 143 are lower than the central part 143. The lower surfaces of the front leg 141$f$ and the rear leg 141$r$ are coupled to a plate member 180 described below.

For instance, as illustrated in FIG. 6, the lower portion of the right attachment part 150 extends along the right side surface 115 of the housing 110 in the up-down direction, while the upper portion of the right attachment part 150 extends farther away from the right side surface 115 in the up direction. The right attachment part 150 may have a cross-sectional shape that protrudes at the central part 155 with respect to the front-rear direction toward the housing 110 in the same way as the extending part 140. Specifically, the central part 155 of the right attachment part 150 protrudes in the direction orthogonal to the direction in which the right attachment part 150 extends. The lower portion of the central part 155 abuts the right side surface 115 of the housing 110. The lower portion of the surface of the central part 155 on the right side surface 115 side is coupled to the right surface of the right side surface 115. The surface of the central part 155 on the right side surface 115 side can be joined to the right surface of the right side surface 115, for instance, by welding. Further, the right attachment part 150 has an upper end surface 153 on the upper end side. The upper end surface 153 extends in the horizontal direction. The upper end surface 153 has a through-hole 151 facing the up-down direction.

For instance, as illustrated in FIG. 6, the lower portion of the left attachment part 130 extends along the left side surface 113 of the housing 110 in the up-down direction, while the upper portion of the right attachment part 150 extends farther away from the left side surface 113 in the up direction. The left attachment part 130 may have a cross-sectional shape that protrudes at the central part 135 with respect to the front-rear direction toward the housing 110 in the same way as the extending part 140. Specifically, the central part 135 of the left attachment part 130 protrudes in the direction orthogonal to the direction in which the left attachment part 130 extends. The lower portion of the central part 135 abuts the left side surface 113 of the housing 110. The lower portion of the surface of the central part 135 on the left side surface 113 side is coupled to the left surface of the left side surface 113. The surface of the central part 135 on the left side surface 113 side can be joined to the left surface of the left side surface 113, for instance, by welding. Further, the left attachment part 130 has an upper end surface 133 on the upper end side. The upper end surface 133 extends in the horizontal direction. The upper end surface 133 has a through-hole 131 facing the up-down direction.

The upper end surface 153 of the right attachment part 150 and the upper end surface 133 of the left attachment part 130 are respectively attachable to a variety of structural members included in the frame of the vehicle 1 by using the through-hole 151 and a through-hole 131. Specifically, the vehicle 1 has as the frame a structure in which members extending in the front-rear direction and members extending in the left-right direction are crossed and disposed. The upper end surface 153 and the upper end surface 133 are respectively attached to those members by fastening screws using the through-hole 151 and the through-hole 131. This allows the attachment members 120 to be attached to the vehicle body.

The above describes an instance in which the extending part 140, the right attachment part 150, and the left attachment part 130 of each attachment member 120 are respectively coupled to the lower surface of the housing 110, the right surface of the right side surface 115, and the left surface of the left side surface 113. The attachment members 120 and the housing 110 may be, however, coupled to each other at any other positions. The attachment members 120 only have to be coupled to the housing 110 at least partially. For instance, the extending part 140 of each attachment member 120 is coupled to the lower surface of the housing 110, but the right attachment part 150 and the left attachment part 130 of each attachment member 120 do not have to be respectively coupled to the right side surface 115 and the left side surface 113 of the housing 110.

The attachment members 120 can be each formed, for instance, by forming parts corresponding to the respective central parts of the extending part 140, the right attachment part 150, and the left attachment part 130 by stamping flat members, and then bending the members. Further, the through-hole 151 and the through-hole 131 of the right attachment part 150 and the left attachment part 130 can be each formed by stamping, cutting, or the like.

The lower surfaces of the attachment members 120 are coupled to the plate member 180 in the present example. The plate member 180 has a substantially plate shape. Specifically, the plate member 180 has a substantially rectangular flat shape as illustrated in FIGS. 3 to 6. As illustrated in FIG. 2, the battery pack 10 is positioned inside the undercover 57, which is a member that separates the lower portion of the vehicle 1 from the outside of the vehicle 1. The plate member 180 is therefore positioned inside the undercover 57. This undercover 57 can be made of a resin. Meanwhile, the plate member 180 can be made of a metallic material. Specifically, the plate member 180 is made of a steel member. The plate member 180 can be therefore made relatively rigid. Specifically, the plate member 180 has greater rigidity than that of the undercover 57. Here, the plate member 180 can receive a relatively heavy load as described below when the lower portion of the vehicle 1 collides with an object outside of the vehicle 1. The plate member 180 has relatively great rigidity as described above, and it is thus possible to secure the strength against the load.

The plate member 180 abuts, for instance, the front leg 141*f* and the rear leg 141*r* of the extending part 140 of each attachment member 120. The upper surface of the plate member 180 is coupled to the lower surfaces of the front leg 141*f* and the rear leg 141*r*. The upper surface of the plate member 180 can be joined to the lower surfaces of the front leg 141*f* and the rear leg 141*r*, for instance, by welding. The plate member 180 of the battery pack 10 according to the present example is coupled to the lower surfaces of the attachment members 120 extending from a side of the housing 110 to the other side along the lower surface of the housing 110. The plate member 180 and the bottom surface 116 of the housing 110 thus face each other. This allows the plate member 180 and the bottom surface 116 of the housing 110 to form the double-bottomed part 190 at the lower portion of the battery pack 10 as illustrated in FIGS. 5 and 6.

In this way, the lower portion of the battery pack 10 according to the present example has the double-bottomed part 190 formed by the plate member 180 and the bottom surface 116 of the housing 110. Accordingly, when the lower portion of the vehicle 1 collides with an object outside the vehicle 1, a load can be transferred to the plate member 180 before the bottom surface 116 of the housing 110. Here, the plate member 180 is coupled to the bottom surface 116 of the housing 110 via the attachment members 120. Even when the plate member 180 locally receives a relatively heavy load, the received load is therefore dispersed and transmitted to the bottom surface 116 via the attachment members 120. This can prevent the bottom surface 116 from locally receiving a relatively heavy load, and thus prevent the relatively heavy load from being imparted to the battery modules 171 in the housing 110.

Further, even when the plate member 180 receives a relatively heavy load, the plate member 180 can absorb the impact by transforming. This can lighten the load transmitted to the bottom surface 116, and thus prevent a relatively heavy load from being imparted to the battery module 171 in the housing 110.

Moreover, when the lower portion of the vehicle 1 collides with an object outside the vehicle 1, the object collides with the lower portion of the battery pack 10 in some cases. In such a case, the object can collide with the plate member 180 in the present example before the bottom surface 116 of the housing 110. Even if the object penetrates the plate member 180, it is therefore possible to prevent the object from penetrating the bottom surface 116 of the housing 110. This can prevent the object from colliding with the battery modules 171 in the housing 110, and thus prevent a relatively heavy load from being imparted to the battery modules 171 in the housing 110.

As described above, according to the present example, even when the battery pack 10 is disposed under the floor of the vehicle 1, it is possible to prevent a relatively heavy load from being imparted to the battery modules 171 in the housing 110. It therefore possible to prevent the battery modules 171 installed in the battery pack 10 disposed under the floor of the vehicle 1 from being damaged.

Further, as described above, coupling the plate member 180 to the lower surfaces of the attachment members 120 can prevent a relatively heavy load from being imparted to the battery modules 171 in the housing 110 in the present example. According to the present example, it is therefore possible to prevent the battery modules 171 from being damaged, while suppressing a relatively large increase in the weight of the battery pack 10.

Further, as described above, the lower portion of the battery pack 10 according to the present example has the double-bottomed part 190, and it is thus possible to separate the internal space of the housing 110 from the external space below the battery pack 10 via the internal space of the double-bottomed part 190. This can ease the change in the temperature of the internal space of the housing 110 caused by the heat coming from below.

The plate member 180 is specifically installed to cover the whole of the lower surface of the housing 110. When the lower portion of the vehicle 1 collides with an object outside the vehicle 1, this can effectively prevent the load from being imparted to the bottom surface 116 of the housing 110 before the plate member 180, and prevent the object from colliding with the bottom surface 116 of the housing 110 before the plate member 180. Accordingly, even when the battery pack 10 is disposed under the floor of the vehicle 1, it is effectively possible to prevent a relatively heavy load from being imparted to the battery modules 171 in the housing 110.

More specifically, the plate member 180 and the lower surface of the housing 110 facing each other may have substantially the same dimensions as illustrated in FIGS. 3 to 6. This makes it possible to cover the whole of the lower surface of the housing 110 with the plate member 180, while suppressing an increase in the weight of the plate member 180.

3. Modification

Figure 8:
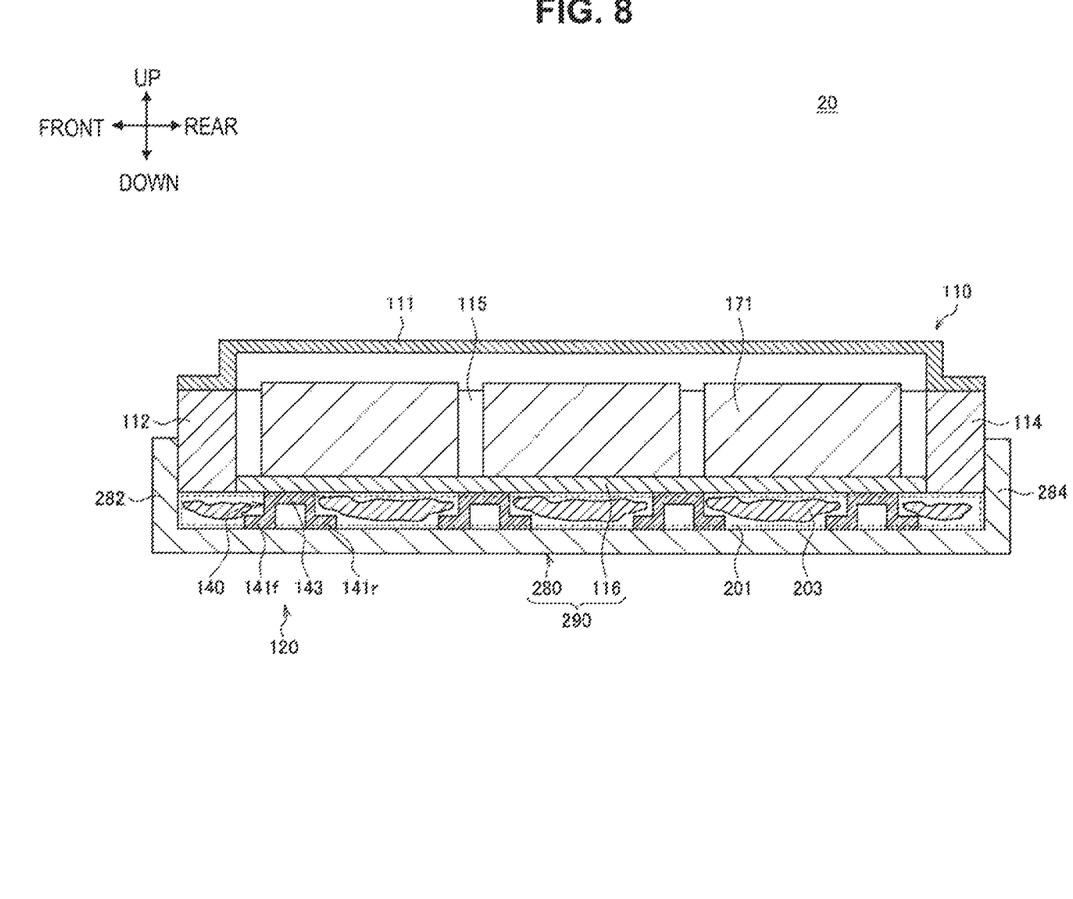
FIG. 8 is a cross-sectional view of the battery pack according to the modification taken along the direction orthogonal to the left-right direction of the vehicle, and illustrates an instance of an internal configuration of the battery pack.
Figure 9:
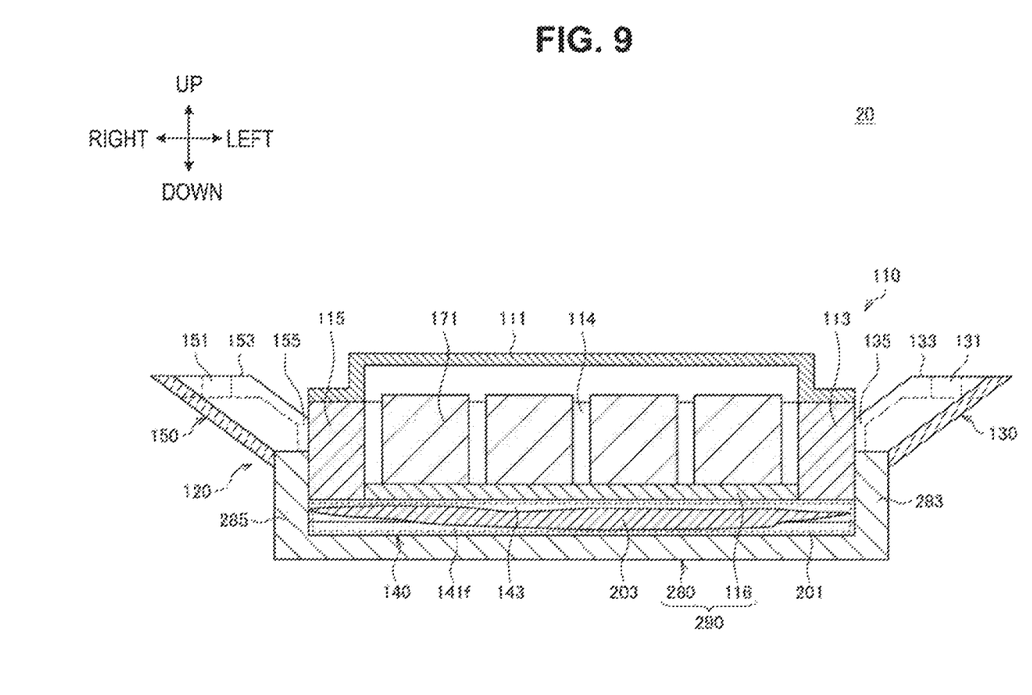
FIG. 9 is a cross-sectional view of the battery pack according to the modification taken along the direction orthogonal to the front-rear direction of the vehicle, and illustrates an instance of the internal configuration of the battery pack.

Next, the configuration of a battery pack 20 according to a modification will be described with reference to FIGS. 7 to 9. The battery pack 20 according to the modification is different from the battery pack 10 according to the present example described with reference to FIGS. 3 to 6 chiefly in the configuration of the plate member. The following will therefore describe chiefly a plate member 280 according to the modification.

Figure 7:
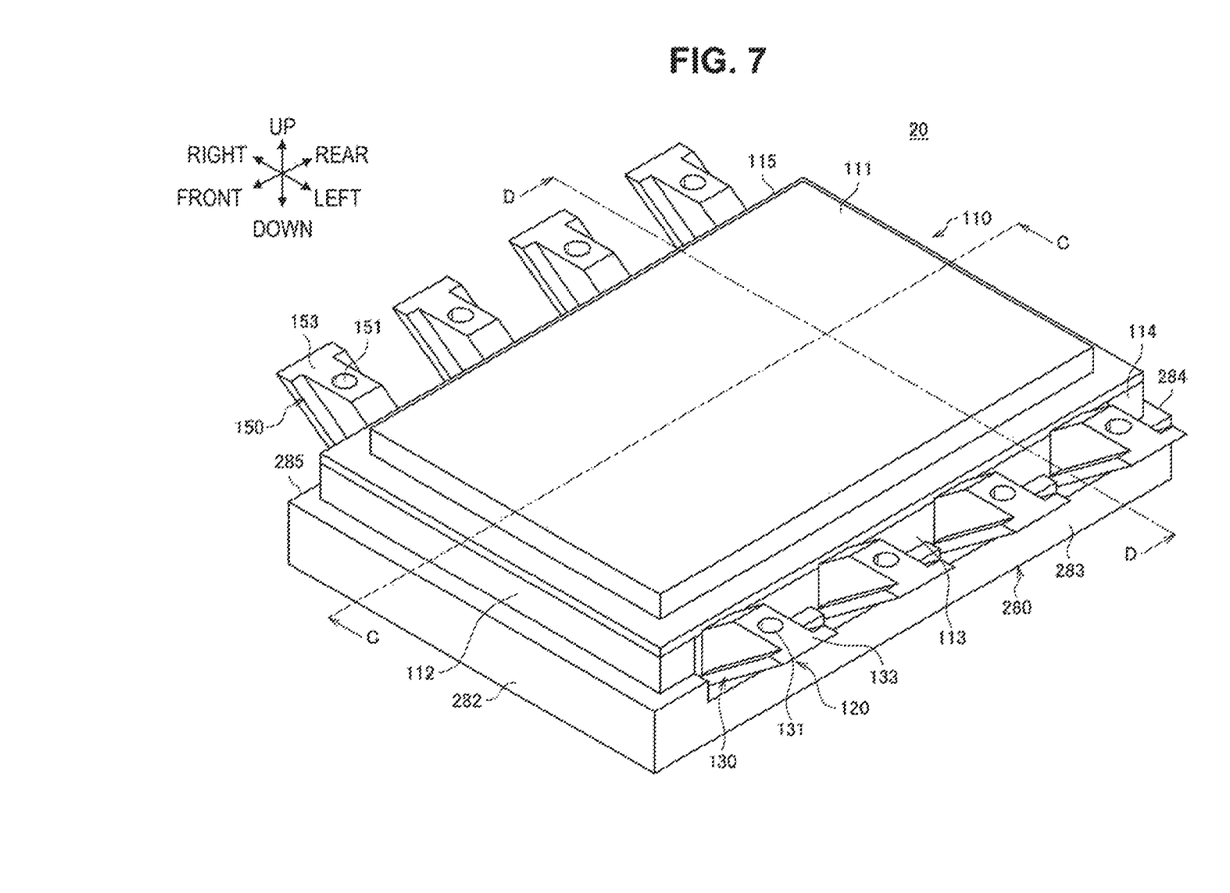
FIG. 7 is a perspective view illustrating an instance of an appearance of a battery pack according to a modification.

FIG. 7 is a perspective view illustrating an instance of the appearance of the battery pack 20 according to the modification. FIG. 8 is a cross-sectional view of the battery pack 20 according to the modification taken along the direction orthogonal to the left-right direction of the vehicle 1, and illustrates an instance of the internal configuration of the battery pack 20. Specifically, FIG. 8 is a cross-sectional view taken along C-C illustrated in FIG. 7. The cross section taken along C-C is a cross section obtained by cutting through the battery modules 171. FIG. 9 is a cross-sectional view of the battery pack 20 according to the modification taken along the direction orthogonal to the up-down direction of the vehicle 1, and illustrates an instance of the internal configuration of the battery pack 20. Specifically, FIG. 9 is a cross-sectional view taken along D-D illustrated in FIG. 7. The cross section taken along D-D is a cross section obtained by cutting through the battery modules 171 and a heat insulating member 203. Additionally, the battery modules 171 are disposed in the housing 110 of the battery pack 20 in the same way as the battery modules 171 of the above-described battery pack 10, which will not thus be described.

The plate member 280 has a substantially plate shape in the same way as the plate member 180 described with reference to FIGS. 3 to 6, and can be made of a metallic material. Further, the plate member 280 abuts, for instance, the front leg 141f and the rear leg 141r of the extending part 140 of each attachment member 120. The upper surface of the plate member 280 is coupled to the lower surfaces of the front leg 141f and the rear leg 141r. The upper surface of the plate member 280 can be joined to the lower surfaces of the front leg 141f and the rear leg 141r, for instance, by welding.

The entire periphery of the plate member 280 according to the modification is joined to the side surfaces of the housing 110. Specifically, as illustrated in FIGS. 7 to 9, the plate member 280 has a front coupling part 282, a left coupling part 283, a rear coupling part 284, and a right coupling part 285. The front coupling part 282, the left coupling part 283, the rear coupling part 284, and the right coupling part 285 respectively protrude upward at the front end, the left end, the rear end, and the right end of the plate member 280. The front coupling part 282, the left coupling part 283, the rear coupling part 284, and the right coupling part 285 are joined to the respective side surfaces of the housing 110, for instance, by welding, thereby joining the entire periphery of the plate member 280 to the side surfaces of the housing 110.

More specifically, the front coupling part 282 extends from the right end side to the left end side of the front side surface 112 of the housing 110 along the front surface of the front side surface 112. The front coupling part 282 abuts the front side surface 112, and the rear surface of the front coupling part 282 is joined to the front surface of the front side surface 112. Further, the left coupling part 283 extends from the front end side to the rear end side of the left side surface 113 of the housing 110 along the left surface of the left side surface 113. The left coupling part 283 abuts the left side surface 113, and the right surface of the left coupling part 283 is joined to the left surface of the left side surface 113. Further, the rear coupling part 284 extends from the right end side to the left end side of the rear side surface 114 of the housing 110 along the rear surface of the rear side surface 114. The rear coupling part 284 abuts the rear side surface 114, and the front surface of the rear coupling part 284 is joined to the rear surface of the rear side surface 114. Further, the right coupling part 285 extends from the front end side to the rear end side of the right side surface 115 of the housing 110 along the right surface of the right side surface 115. The right coupling part 285 abuts the right side surface 115, and the left surface of the right coupling part 285 is joined to the right surface of the right side surface 115.

Additionally, the left coupling part 283 and the right coupling part 285 may have notches having the shapes corresponding to the shapes of the left attachment part 130 and the right attachment part 150 of each attachment member 120 to prevent intervention in the left attachment part 130 and the right attachment part 150. Further, the front coupling part 282, the left coupling part 283, the rear coupling part 284, and the right coupling part 285 may be permanently affixed to other portions of the plate member 280 or separated from the plate member 280.

Similarly to the battery pack 10, the plate member 280 of the battery pack 20 is coupled to the lower surfaces of the attachment members 120 extending from a side of the housing 110 to the other side along the lower surface of the housing 110. The plate member 280 and the bottom surface 116 of the housing 110 thus face each other. This allows the plate member 280 and the bottom surface 116 of the housing 110 to form the double-bottomed part 290 at the lower portion of the battery pack 20 as illustrated in FIGS. 8 and 9. Here, as described above, the entire periphery of the plate member 280 is joined to the side surfaces of the housing 110. Accordingly, the front side, the left side, the rear side, and the right side of the double-bottomed part 290 are respectively closed by the front coupling part 282, the left coupling part 283, the rear coupling part 284, and the right coupling part 285. There is therefore formed a closed space 201 inside the double-bottomed part 290 as illustrated in FIGS. 8 and 9.

In this way, the double-bottomed part 290 formed at the lower portion of the battery pack 20 according to the modification has the closed space 201 therein. When the lower portion of the vehicle 1 collides with an object outside the vehicle 1, this can more effectively prevent the load from being imparted to the bottom surface 116 of the housing 110 before the plate member 280, and prevent the object from colliding with the bottom surface 116 of the housing 110 before the plate member 280. Even when the battery pack 10 is disposed under the floor of the vehicle 1, it is therefore possible to more effectively prevent a relatively heavy load from being imparted to the battery modules 171 in the housing 110.

Further, according to the modification, the closed space 201 is formed in the double-bottomed part 290, thereby making it possible to further improving the effects of insulating the internal space of the housing 110 from external heat. Here, the double-bottomed part 290 may include the heat insulating member 203 therein. Specifically, as illustrated in FIGS. 7 and 8, the heat insulating member 203 can be installed in the closed space 201. More specifically, the closed space 201 is sectioned into partial spaces by the attachment members 120. Each of the partial spaces can be provided with the heat insulating member 203. This can further improve the effects of insulating the internal space of the housing 110 from external heat.

4. Conclusion

As described above, according to the present example, the plate member 180 is coupled to the lower surfaces of the attachment members 120 extending from a side of the housing 110 to the other side along the lower surface of the housing 110, and the lower portion of the battery pack 10 has the double-bottomed part 190 formed by the plate member 180 and the bottom surface 116 of the housing 110. Even when the lower portion of the vehicle 1 collides with an object outside the vehicle 1, and the plate member 180 locally receives a relatively heavy load, this can prevent the relatively heavy load from being locally imparted to the bottom surface 116. Further, the plate member 180 can absorb impact by transforming, and thus lighten the load transmitted to the bottom surface 116. Further, if an object outside the vehicle 1 penetrates the plate member 180, it is therefore possible to prevent the object from penetrating the bottom surface 116 of the housing 110.

According to the present example, even when the battery pack 10 is disposed under the floor of the vehicle 1, it is therefore possible to prevent a relatively heavy load from being imparted to the battery modules 171 in the housing 110. It is therefore possible to prevent the battery modules 171 installed in the battery pack 10 disposed under the floor of the vehicle 1 from being damaged.

Further, as described above, coupling the plate member 180 to the lower surfaces of the attachment members 120 can prevent a relatively heavy load from being imparted to the battery modules 171 in the housing 110 in the present example. According to the present example, it is therefore possible to prevent the battery modules 171 from being damaged, while suppressing a relatively large increase in the weight of the battery pack 10.

Further, the lower portion of the battery pack 10 according to the present example has the double-bottomed part 190, and it is thus possible to separate the internal space of the housing 110 from the external space below the battery pack 10 via the internal space of the double-bottomed part 190. This can ease the change in the temperature of the internal space of the housing 110 caused by the heat coming from below.

Additionally, the above describes an instance in which the attachment members 120 extend in the left-right direction of the vehicle 1, but the direction in which the attachment members 120 extend is not limited to the instance. For instance, the attachment members 120 may extend in the front-rear direction of the vehicle 1.

Further, the above describes an instance in which the heat insulating member 203 is installed in the closed space 201 of the battery pack 20, but the double-bottomed part in which the heat insulating member 203 is installed does not have to necessarily have the closed space 201. For instance, the heat insulating member 203 may be installed in the double-bottomed part 190 of the battery pack 10 described with reference to FIGS. 3 to 6. This can improve the effects of insulating the internal space of the housing 110 from external heat.

Further, the above describes each component of the battery pack 10 with reference to each figure, but the shape and disposition of each component are not limited to the instance corresponding to each figure. The shape and disposition illustrated in each figure are merely an instance. For instance, the shape of the housing 110 does not have to be symmetric with respect to the front-rear direction, or with respect to the left-right direction. Further, the battery modules 171 do not have to be disposed symmetrically with respect to the front-rear direction in the housing 110, or do not have to be disposed symmetrically with respect to the left-right direction. Further, the battery modules 171 may be installed in the housing 110 in a multistage manner with respect to the up-down direction. Further, the cross-sectional shape of each attachment member 120 is not limited to the illustrated instances, but can be set as appropriate.

Further, the above describes an instance in which the vehicle 1 including the battery pack 10 is an electric vehicle including the drive motor 63*f* for driving the front left wheel and the front right wheel, and the drive motor 63*r* for driving the rear left wheel and the rear right wheel, but the technical scope of the present invention is not limited to the instance. A vehicle configured in a different manner may also be applied as a vehicle including the battery pack 10. For instance, the battery pack 10 may be installed in an electric vehicle including a drive motor for each drive wheel. Further, the battery pack 10 may be installed in a hybrid electric vehicle. Further, the number of drive motors installed in a vehicle including the battery pack 10 is not limited in particular.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A battery pack comprising:
a housing configured to be positioned under a floor of a vehicle and to be a part of the vehicle, wherein the housing, in a positioned state under the floor of the vehicle, includes a top surface, a bottom surface opposite to the top surface and side surfaces coupled to the top surface and the bottom surface, and wherein the top surface, the bottom surface and the side surfaces surround an inside region that includes a space and define an outside region other than the inside region;
at least one battery disposed within the space;
attachment members coupled to the housing, wherein the attachment members are disposed in the outside region and attachable to a body of the vehicle; and
a plate member coupled to the attachment members, wherein the plate member is disposed in the outside region, and includes an upper surface that faces the bottom surface of the housing, wherein
each of the attachment members extends from a side of the housing to another side of the housing along the bottom surface of the housing,
each of the attachment members includes an extending part positioned between the plate member and the bottom surface of the housing,
the extending part of each of the attachment members composes extending parts,
an upper surface of the extending part faces the bottom surface of the housing and is coupled to the bottom surface of the housing,
a lower surface of the extending part faces the upper surface of the plate member and is coupled to the upper surface of the plate member,
the upper surface of the extending part is opposite to the lower surface of the extending part,
the plate member is positioned between the floor of the vehicle and an undercover of the vehicle that separates a lower portion of the vehicle from an outside that does not belong to the vehicle,
the upper surface of the plate member is separated from the bottom surface of the housing with the extending parts that are sandwiched between the upper surface of the plate member and the bottom surface of the housing,
the extending parts are separated from each other, and
the upper surface of the plate member, the bottom surface of the housing, and the extending parts define one or more internal spaces therebetween.

2. The battery pack according to claim 1, wherein
the plate member is made of a metallic material, and has rigidity that is greater than rigidity of the undercover, and
lower surfaces of the attachment members are coupled to the upper surface of the plate member.

3. The battery pack according to claim 1, wherein
when seen from a bottom of the vehicle in the positioned state under the floor of the vehicle, the plate member covers a whole of the bottom surface of the housing, and
the plate member has a flat plate shape.

4. The battery pack according to claim 2, wherein
when seen from a bottom of the vehicle in the positioned state under the floor of the vehicle, the plate member covers a whole of the bottom surface of the housing, and
the plate member has a flat plate shape.

5. The battery pack according to claim 3, wherein
the plate member and the bottom surface of the housing facing each other have a same dimension.

6. The battery pack according to claim 4, wherein
the plate member and the bottom surface of the housing facing each other have a same dimension.

7. The battery pack according to claim 1, wherein
an entire periphery of the plate member is joined to the side surfaces of the housing,
the bottom surface of the housing and the plate member provide a double-bottomed part, and
the double-bottomed part has a closed space therein.

8. The battery pack according to claim 2, wherein
an entire periphery of the plate member is joined to the side surfaces,
the bottom surface of the housing and the plate member provide a double-bottomed part, and
the double-bottomed part has a closed space therein.

9. The battery pack according to claim 3, wherein
an entire periphery of the plate member is joined to the side surfaces,
the bottom surface of the housing and the plate member provide a double-bottomed part, and
the double-bottomed part has a closed space therein.

10. The battery pack according to claim 4, wherein
an entire periphery of the plate member is joined to the side surfaces,
the bottom surface of the housing and the plate member provide a double-bottomed part, and
the double-bottomed part has a closed space therein.

11. The battery pack according to claim 5, wherein
an entire periphery of the plate member is joined to the side surfaces,
the bottom surface of the housing and the plate member provide a double-bottomed part, and
the double-bottomed part has a closed space therein.

12. The battery pack according to claim 1, wherein
the bottom surface of the housing and the plate member provide a double-bottomed part, and
the double-bottomed part includes a heat insulating member therein.

13. The battery pack according to claim 2, wherein
the bottom surface of the housing and the plate member provide a double-bottomed part, and
the double-bottomed part includes a heat insulating member therein.

14. The battery pack according to claim 3, wherein
the bottom surface of the housing and the plate member provide a double-bottomed part, and
the double-bottomed part includes a heat insulating member therein.

15. The battery pack according to claim 4, wherein
the bottom surface of the housing and the plate member provide a double-bottomed part, and
the double-bottomed part includes a heat insulating member therein.

16. The battery pack according to claim 5, wherein
the bottom surface of the housing and the plate member provide a double-bottomed part, and
the double-bottomed part includes a heat insulating member therein.

17. The battery pack according to claim 6, wherein
the bottom surface of the housing and the plate member provide a double-bottomed part, and
the double-bottomed part includes a heat insulating member therein.

18. The battery pack according to claim 1, wherein
the extending part of each of the attachment members extends along the bottom surface of the housing from the side of the housing to the other side of the housing,
each of the attachment members further includes:
  attachment parts that protrude upward from ends of the extending part, and that are coupled to the side surfaces of the housing, and
  upper end surfaces that are respectively attachable to one or more structural members of the vehicle, and
each of the attachment parts includes:
  lower portions that extend upward from the ends of the extending part, and that extend parallel to the side surfaces of the housing, and
  upper portions that extend diagonally upward from the lower portions, and that extend in a direction away from the side surfaces of the housing more than the lower portions.

19. The battery pack according to claim 1,
wherein thicknesses of the one or more internal spaces are substantially equal to thicknesses of the extending part.

* * * * *